(12) United States Patent
Iwamura

(10) Patent No.: US 8,904,443 B2
(45) Date of Patent: Dec. 2, 2014

(54) SYSTEM AND METHOD FOR IMPROVING HOME NETWORK GUI RESPONSE TIME AND PRESENTATION

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1775 days.

(21) Appl. No.: 11/509,206

(22) Filed: Aug. 24, 2006

(65) Prior Publication Data

US 2007/0055988 A1 Mar. 8, 2007

Related U.S. Application Data

(60) Provisional application No. 60/714,797, filed on Sep. 7, 2005.

(51) Int. Cl.
| | |
|---|---|
| G06F 3/00 | (2006.01) |
| G06F 13/00 | (2006.01) |
| H04N 5/445 | (2011.01) |
| H04N 7/16 | (2011.01) |
| H04L 12/28 | (2006.01) |
| H04N 21/41 | (2011.01) |
| H04N 21/4363 | (2011.01) |
| H04N 21/47 | (2011.01) |
| H04W 28/26 | (2009.01) |
| H04W 74/04 | (2009.01) |

(52) U.S. Cl.
CPC ............ *H04N 7/163* (2013.01); *H04L 12/2803* (2013.01); *H04L 12/282* (2013.01); *H04N 21/4135* (2013.01); *H04N 21/43632* (2013.01); *H04N 21/47* (2013.01); *H04L 2012/2841* (2013.01); *H04L 2012/2843* (2013.01); *H04L 2012/2849* (2013.01); *H04W 28/26* (2013.01); *H04W 74/04* (2013.01)

USPC ............................................... 725/54; 725/90

(58) Field of Classification Search
USPC ............. 725/54, 37, 41, 90, 126; 370/395.64; 375/E7.151
See application file for complete search history.

(56) References Cited

U.S. PATENT DOCUMENTS

| | | | |
|---|---|---|---|
| 5,892,881 A | 4/1999 | Takishima | |
| 6,297,797 B1 | 10/2001 | Takeuchi et al. | ............... 345/141 |
| 6,651,252 B1 * | 11/2003 | Gordon et al. | .................. 725/54 |
| 7,082,257 B2 | 7/2006 | Yamauchi et al. | ............... 386/95 |
| 7,194,032 B1 * | 3/2007 | Easwar et al. | ............ 375/240.12 |
| 7,376,908 B2 * | 5/2008 | Barrett | .......................... 715/767 |
| 7,403,563 B2 * | 7/2008 | Okada et al. | ............. 375/240.13 |
| 7,536,705 B1 * | 5/2009 | Boucher et al. | ............... 725/112 |
| 2001/0052127 A1 | 12/2001 | Seo et al. | |

(Continued)

FOREIGN PATENT DOCUMENTS

| | | |
|---|---|---|
| JP | 09-045007 | 2/1997 |
| JP | 2003-046925 | 2/2003 |

(Continued)

*Primary Examiner* — Scott Beliveau
*Assistant Examiner* — Patrick A Ryan
(74) *Attorney, Agent, or Firm* — John L. Rogitz

(57) ABSTRACT

GUI presentation in a home network is improved by using a video encoding tailored for GUI, while using normal video encoding for video presentation. Also, GUI command response time is shortened by reserving, for transmission of commands originated by a user input device, a time slot in a contention free period (CFP) of a transmission cycle between a client device receiving the commands and a server executing them.

16 Claims, 5 Drawing Sheets

(56) References Cited

U.S. PATENT DOCUMENTS

| | | |
|---|---|---|
| 2005/0002373 A1 | 1/2005 | Watanabe |
| 2005/0030967 A1 | 2/2005 | Ohmi |
| 2005/0069297 A1 | 3/2005 | Kobayashi |
| 2005/0122974 A1* | 6/2005 | Hubler .......................... 370/389 |

FOREIGN PATENT DOCUMENTS

| | | |
|---|---|---|
| JP | 2005-175974 | 6/2005 |
| JP | 2005-118146 | 12/2005 |
| WO | 97/03521 | 1/1997 |
| WO | 00/05888 | 2/2000 |

\* cited by examiner

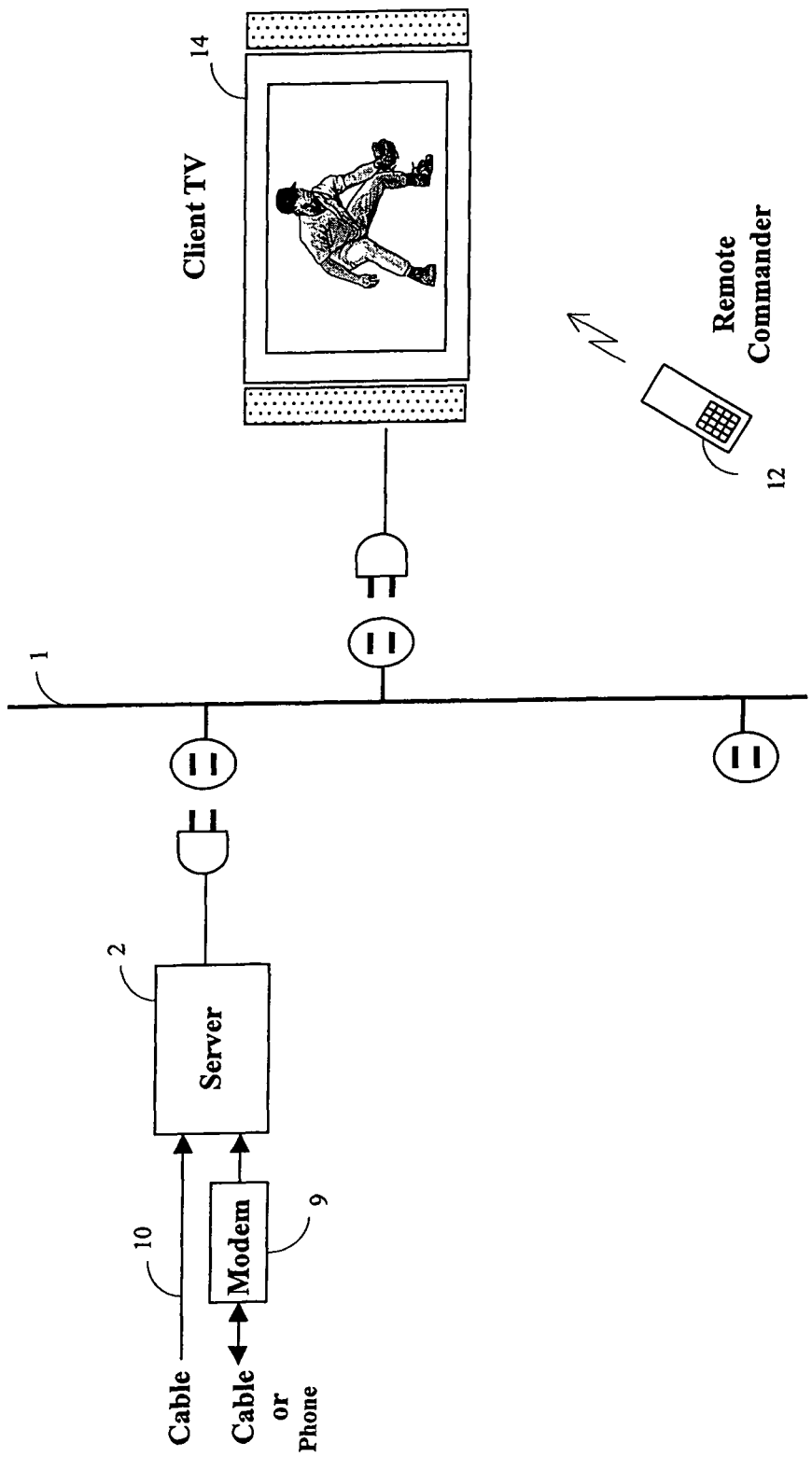

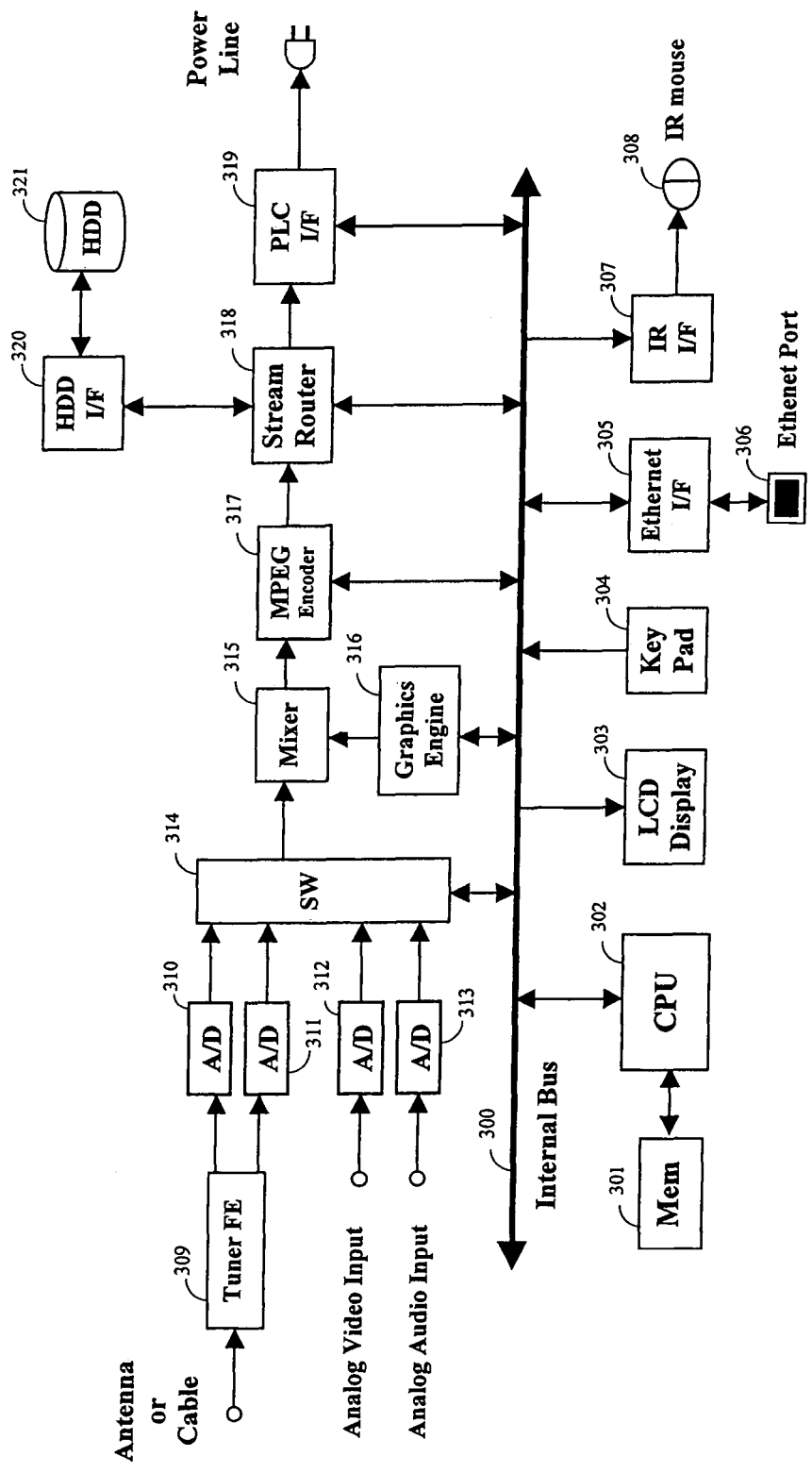
Fig.2 Server Block Diagram

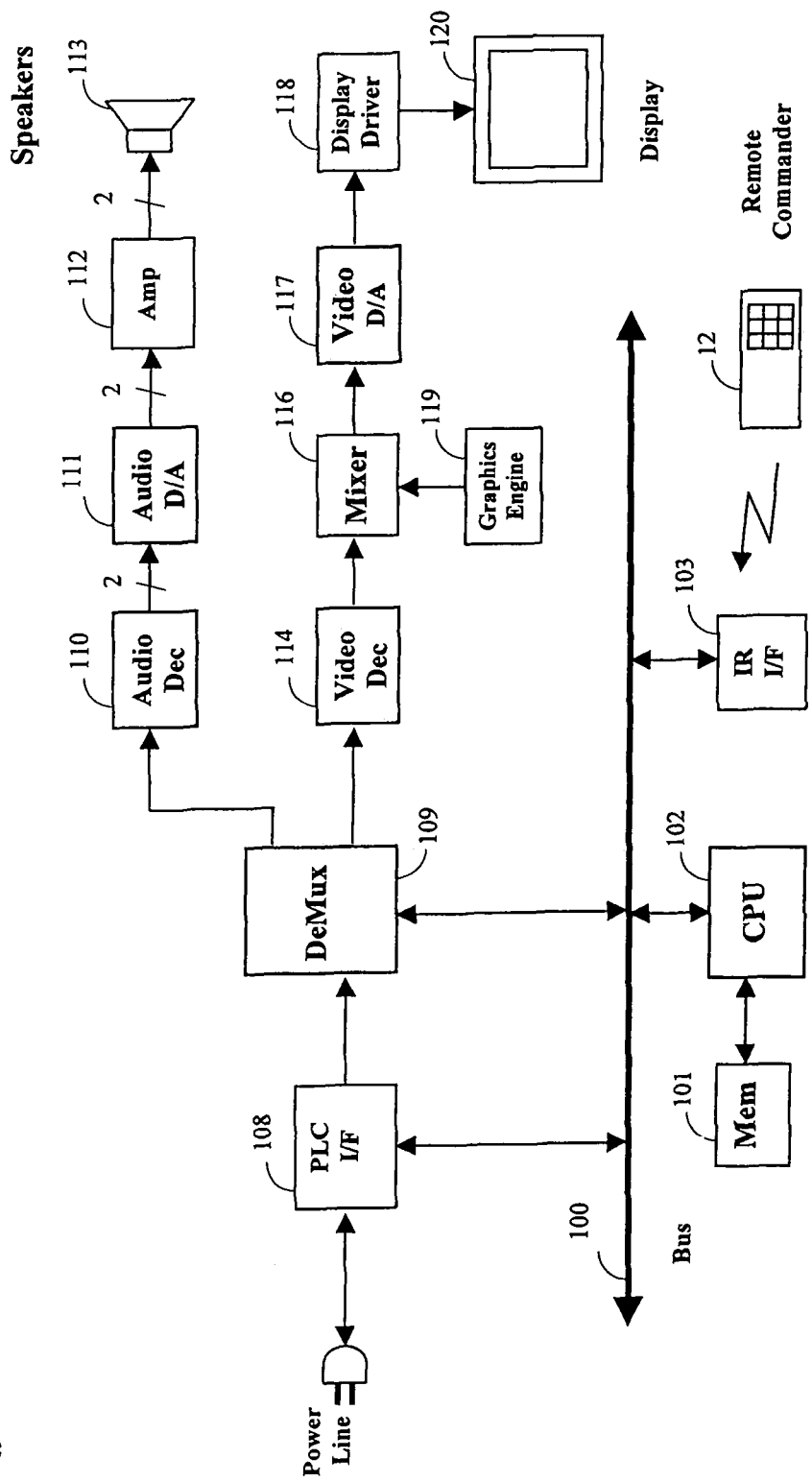
Fig.3 Client TV

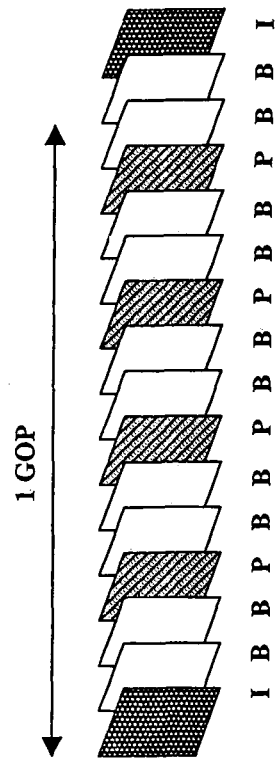
Fig.4-a GOP (normal mode)
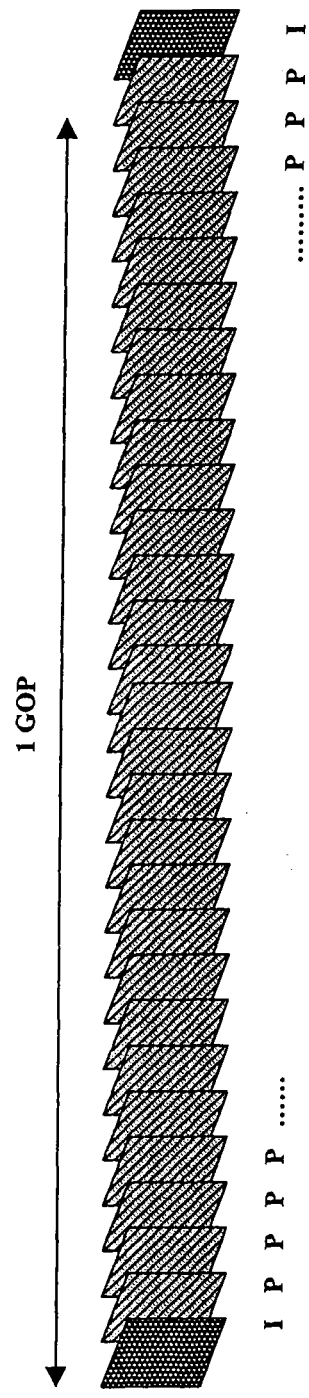
Fig.4-b GOP (GUI mode)

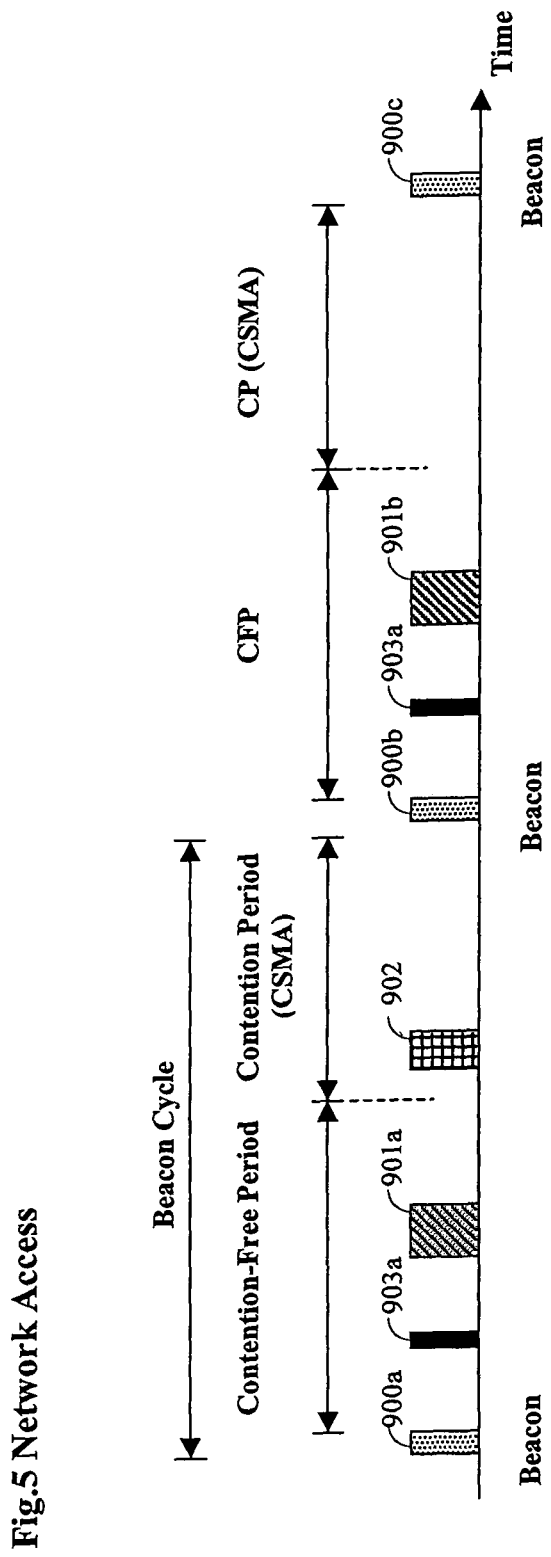
Fig.5 Network Access

SYSTEM AND METHOD FOR IMPROVING HOME NETWORK GUI RESPONSE TIME AND PRESENTATION

RELATED APPLICATION

This application claims priority from U.S. provisional application Ser. No. 60/714,797, filed Sep. 7, 2005.

FIELD OF THE INVENTION

The present invention relates generally to home networks.

BACKGROUND OF THE INVENTION

Home networks have become used on an increasingly greater scale. The user of a home network controls a remote server from a client device via the network using, e.g., an input device such as a TV remote control device. Other client devices such as DVD players, personal video controllers, etc. typically are also part of the network, and the server thus affords central control of all devices by means of a simple remote control device.

As understood herein, the graphic user interface (GUI) that the server presents on, e.g., a client TV for the user to employ in entering commands is not easily, and remotely, used. More specifically, the GUI ordinarily displays still text data such as menu, exit, back, etc., but is displayed using less than optimum video encoding, i.e., the video encoding that is used to optimize motion picture quality. As understood by the present invention, this video encoding rate is inefficient in terms of still picture with text data, resulting in GUI text data often being shown unclearly.

As also recognized herein, the response of many server-based home network systems to remote commands is slow, sometimes in excess of a second. This is because remote commands are forced into time slots that may be occupied by other data, e.g., audio/video data, and hence the transmission of a command from a client device to the server can be delayed by a noticeable and inconvenient period while transmission of the non-command data is effected.

SUMMARY OF THE INVENTION

A method is disclosed for displaying a graphical user interface (GUI) on a video display in a network. The network includes a client device communicating with a server, and the client device receives input from a user input device. The method includes using a first video encoding to display moving video on the video display, and using a second video encoding to display the GUI on the video display, with the second encoding being different from the first encoding.

In non-limiting implementations the client device is a TV, the user input device is a wireless remote control device communicating with the TV, the video display is established by the TV, and signals from the remote control device are received by the TV and are sent to the server.

In some implementations the first video encoding can be MPEG encoding defining a group of pictures (GOP). Each GOP in the first encoding includes an intra-frame (I-frame), plural predictive frames (P-frames) and plural bi-directionally predictive frames (B-frames). In specific non-limiting embodiments a GOP in the first encoding is defined by fifteen frames including an I-frame, four P-frames, and ten B-frames, possibly in the following order: I, B, B, P, B, B, P, B, B, P, B, B, P, B, B. In contrast, the second encoding, in non-limiting implementations, may define a group of pictures (GOP) having more than the number of frames in a GOP of the first encoding and/or more than the amount of data in an I-frame of the first encoding. For example, a GOP of the second encoding may include substantially twice the number of I-frames as a GOP of the first encoding, and each I-frame in a GOP of the second encoding may carry substantially twice the amount of data as that carried in an I-frame in a GOP of the first encoding. A GOP of the second encoding may have only I-frames and plural P-frames, but no B-frames. For instance, a GOP of the second encoding may include thirty frames, an I-frame and twenty-nine P-frames.

In another aspect, in a system having a client audio/video device controlled by a server in response to commands received from a user input device, a method for facilitating relatively fast command response times includes establishing plural transmission cycles. Each cycle includes a contention-free period (CFP) and a contention period (CP). An audio/video stream is sent from the server to the client device in the CFP, and a time allocation of the CFP is obtained for the stream and is reserved every cycle until the stream terminates. At least one time slot is reserved in the CFP of each cycle exclusively for sending commands, originated by the user input device, between the server and the client device.

In non-limiting implementations of this second aspect, the time slot has a bandwidth of no more than a few kilobytes per second. The time slot and the stream are not constrained to be consecutive on a time axis. If desired, the time slot can be reserved for commands until stream transmission ends.

A remote command may be sent in the time slot from the client device to the server. Also, the time slot can be used bi-directionally to exchange information between the server and the client device. For example, a first time slot portion in the CFP can be reserved for messages from the server to the client device and a second time slot portion in the CFP can be reserved for messages from the client device to the server.

If the CFP is substantially occupied, the method can include sending an initial command, generated by the user input device, from the client device to the server during the CP. In this case, the method can include, in response to receiving the initial command, reserving the time slot in the CFP for following commands. Then, if no commands are received for a predetermined period, the time slot may be released and the next command can be treated as an initial command, sent during the CP.

In non-limiting implementations, if the command causes an interrupt in the client device or the server, the interrupt is given a highest priority. The cycle may be a beacon cycle synchronized to an AC line cycle, and the CP can be a one-time access period without guarantee that the same time allocation will be reserved for a following cycle.

In another aspect, a server for a system that includes a client device configured to display audio/video streams from the server and a user input device sends graphical user interface (GUI) signals to the client device using a first video encoding. The server also sends video stream signals to the client device using a second video encoding different from the first video encoding.

In still another aspect, a server is disclosed for a system. The system has a client device configured to display audio/video streams from the server and a user input device, and the server reserves at least one time slot in the contention free periods (CFP) of at least two consecutive beacon cycles for transmission of graphical user interface (GUI) commands, originated by the user input device, between the server and the client device. Each beacon cycle also has a respective contention period (CP).

In yet another aspect, a system has a server, a client device receiving audio/video streams from the server for display thereof on the client device, and a user input device communicating with the client device for inputting commands thereto. The commands are sent from the client device to the server. Means are provided for causing video stream signals to be encoded using a first encoding for display on the client device, and means are also provided for causing graphical user interface (GUI) signals to be encoded using a second encoding different from the first encoding for display of a GUI on the client device. Further, the system includes means for reserving at least one time slot in a contention free period (CFP) of a transmission cycle also having a contention period (CP), with the time slot being reserved for transmission of commands, originated by the user input device, from the client device to the server.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic diagram of a non-limiting home network implemented as a power line network;

FIG. 2 is a block diagram of a non-limiting network server;

FIG. 3 is a block diagram of a non-limiting client device implemented as a TV on the network;

FIG. 4-a is a schematic diagram of frames in a group of pictures (GOP) for normal video;

FIG. 4-b is a schematic diagram of frames in a non-limiting group of pictures (GOP) for GUI presentation in accordance with present principles; and FIG. 5 is a schematic timing diagram illustrating a non-limiting sequence of signaling for promoting GUI response time in accordance with present principles.

DETAILED DESCRIPTION OF THE PREFERRED EMBODIMENT

Referring initially to FIG. 1, a non-limiting home network is shown that is implemented as a power line network with network devices, it being understood that the network may be an Ethernet, an 802.11 wireless network, or any other network. A server 2 can receive a signal from a cable 10 or Internet data from a modem 9. The modem 9, for example, can be a cable mode or an ADSL telephone line modem. Further, the server 2 sends an audio/video stream to a client TV 14 over a power line 1 or, as mentioned above, over another type of network backbone. In response, the client TV 14 decodes the stream and displays decoded video on the screen. Additionally, the client TV 14 can receive commands such as play, stop, fast forward, fast reverse, channel up/down, volume up/down, and so on from a remote commander 12. Depending on the commands, some of the commands will be forwarded to the server 2. In any case, additional client devices such as DVD players, PVRs, etc. can also be part of the network.

FIG. 2 shows a block diagram of a non-limiting implementation of the server 2. An analog cable signal is tuned and demodulated in a tuner/frontend 309. The video output from the tuner/frontend 309 is analog-digital converted in an analog to digital converter (A/D) 310 and is sent to a switch 314. The output of the A/D 310 could be, for example, ITU-R BT.656 format 4. Similarly, the audio output from the tuner/frontend 309 can be analog-digital converted in an A/D 311 and sent to the switch 314. In the same manner, external analog audio/video signals, from a source such as a DVD player, are analog-digital converted in A/Ds 312 and 313 and sent to the switch 314.

As shown in FIG. 2, the output of the switch 314 is mixed at a mixer 315 with graphic (GUI) data that is generated by a graphic engine 316. The result is MPEG-encoded in an MPEG encoder 317.

As understood herein, the external analog video input may already include GUI data. For example, a DVD player can output a menu screen to the server 2. In this case, no GUI need be added and no mixing need be done by the mixer 315. Rather, the digital signal goes directly to the MPEG encoder 317.

As contemplated herein, the MPEG encoder 317 encodes the incoming stream at a fixed rate or at a variable rate. In the variable rate mode, the encoding rate is adjusted to meet transmission conditions. When noise increases and the actual bandwidth is reduced as a consequence, the encode rate is reduced. If the network condition improves, the encoding rate can be returned to the original (higher) rate.

Still referring to FIG. 2, a stream router 318 routes the incoming stream in an appropriate direction. Taking one of the paths shown in FIG. 2, the MPEG encoder output can be sent to a power line communication (or other network) interface 319 for network transmission. Or, the stream may be sent to a hard disk drive (HDD) interface 320 to record to a HDD 321. The stream router 318 may also receive a playback stream from the HDD interface 320 and send it to the PLC interface 319.

As shown in FIG. 2, the server 2 has a central processing unit (CPU) 302 that controls all the server components through an internal bus 300. The CPU 302 runs the control software program stored in a memory 301. Also, a keypad 304 can be provided to send user input data to the CPU 302 through the bus 300. A liquid crystal display (LCD) or other type of visual display 303 may indicate the data sent from the CPU 302 (e.g., tuning status, network status, error messages, etc.) The modem 9 shown in FIG. 1 can be connected to an Ethernet port 306 in the server 2, so that data from the modem 9 can be sent to the CPU 302 and processed through the Ethernet interface 305. If desired, the CPU 302 may send an infrared (IR) command to an IR mouse 308 through an IR interface 307, with the IR mouse 308 emitting an IR command to an outside source, such as a DVD player.

Turning now to FIG. 3, which illustrates a block diagram of a non-limiting client device that is implemented as a client TV 14, a PLC interface 108 of the client device can receive a signal sent over the power line 1. In some implementations the output signal from the PLC interface 108 is demultiplexed in a demultiplexer 109 and sent to an audio decoder 110 and to a video decoder 114, respectively. In a mixer 116, decoded video signals from the video decoder 114 are mixed with graphics data generated in a graphics engine 119 and digital-analog converted in a video digital to analog converter (D/A) 117. When GUI data is sent from the server 2, the graphics engine need not be used and the incoming data is directly sent to the video D/A 117. In either case, in the TV implementation of the client device, the output of the D/A 117 is sent to a display driver 118 and displayed on a video display 120.

On the audio side, decoded audio signals from the audio decoder 110 are digital-analog converted in an audio D/A 111, amplified in an amplifier 112, and sent to speakers 113. The audio D/A 111, amplifier 112, and speakers 113 can, in one non-limiting implementation, handle two audio channels, left and right.

In the non-limiting client device shown, a client device CPU 102 may exchange asynchronous data (commands, data, etc.) with the CPU 302 in the server 2 over the power line 1. The client CPU 102 controls all the client device components through an internal bus 100. The client CPU 102 can run control software program stored in a memory 101 on the bus 100, and an IR interface 103 on the bus 100 can receive commands from the remote commander 12 shown in FIG. 1. The commands are sent to the client CPU 102 through the client bus 100 and, if required, are forwarded to the CPU 302 in the server 2 over the power line 1.

Having described non-limiting implementations of a server and client device, attention is now directed to FIGS. 4-*a* and 4-*b* to understand the differential encoding aspect of the invention. In the MPEG video format, one group of pictures (GOP) consists of an Intra-frame (I-frame), several Predictive frames (P-frame), and Bi-directionally predictive frames (B-frame). A typical GOP has fifteen frames (and is about one-half second in temporal length): an I-frame, four P-frames, and ten B-frames, typically in the order of I, B, B, P, B, B, P, B, B, P, B, B, P, B, B (FIG. 4-*a*).

As understood herein, it is generally the case that GUI data has little motion. Instead, GUI data in most cases is a still picture until the user presses a remote button. Accordingly, when a GUI is displayed, in accordance with present principles the MPEG encoder 317 in the server 2 encodes the GUI data differently from "normal" video encoding by, e.g., making the GOP length longer, for example, twice the length (thirty frames) of the "normal" GOP length described above. Also, twice the amount of data may be assigned to each GUI GOP I-frame, compared to the data in an I-frame of a "normally" encoded video stream. The total data rate under these circumstances remains the same, but by applying a higher rate to I-frames, the GUI picture quality is improved.

Additionally, when encoding GUI GOPs, no B-frames need be used. This is because, as recognized herein, a B-frame requires frame reordering in the MPEG decoder 114 of the client device, which causes a delay of a frame or more. When encoding motion pictures, a B-frame reduces the amount of data that must be sent, but in the context of still pictures such as GUI images, the data size of a B-frame is almost the same as that of a P-frame.

Accordingly, with the above recognitions in mind, one GUI GOP can be encoded, for example, as thirty frames: an I-frame and twenty-nine P-frames as shown in FIG. 4-*b*. This encoding mode is applied when the user selects the GUI mode. When the GUI mode is over and the system returns to the normal moving video play mode, the original ("normal") encoding is reverted to, e.g., to the pattern shown in FIG. 4-*a*. This encoding switch can be performed on the fly without stop or break of video.

Having described differential encoding to improve GUI image display, attention is now directed to FIG. 5 to illustrate network access timing that can be used to speed up command response. The server 2, or another device broadcasts a beacon 900 periodically. The beacon cycle may be synchronized to the AC line cycle (50 Hz or 60 Hz). A typical beacon cycle consists of a contention-free period (CFP) and a contention period (CP) as defined further below. An audio/video stream is isochronous and it uses the CFP. Once a time allocation is obtained for the stream, the time allocation is reserved every beacon cycle (shown at 901*a*, 901*b*) until the stream terminates.

On the other hand, the CP is used for, e.g., carrier sense multiple access (CSMA). Use of the CP is on a first come—first served basis and is one-time access, so that even once a time allocation (902) is obtained in the current beacon cycle, there is no guarantee that the same time allocation will be reserved for any particular process in the following beacon cycle.

With this understanding in mind, the present invention recognizes that remote commands heretofore have been sent in the CP which, if fully occupied, causes conflicts with other messages, resulting in command execution delays of one or more beacon cycles. These delays in turn result in a slow command response. To solve this problem, the present invention uses the CFP for command transmission. When the server 2 starts sending the AV stream (901), a time slot for commands (903) is reserved in the CFP. The time slot may have a very narrow bandwidth, for example, a single or a few kilobytes per second, which is enough to send a remote command. The time slot 903 and the stream 901 do not have to be in consecutive order on the time axis. The time slot for commands preferably is reserved exclusively for remote commands until the stream transmission is over.

In any case, the client TV 14 can send, to the server 2, a remote command received from the remote commander 12 during this time slot. Moreover, the CFP time slot may be used bi-directionally to exchange information between the server 2 and the client TV 14. For example, TCP/IP may be applied, in which the transmitter expects an acknowledgement from the receiver. Alternatively, a different time slot may be reserved for each of an inbound and an outbound message. The CFP time slot may be reserved even when no command is sent between the server 2 and the client TV 14.

On the other hand, if the CFP is at or near full capacity, the server 2 may want to conserve as much bandwidth as possible, and accordingly may apply the following method. The first command is sent during the CP (CSMA). In response, the CFP time slot is reserved in the CFP for following commands. (Usually, the user pushes remote buttons several times in a row to change the channel, volume level, etc.) All the following commands are sent using the CFP (903). If the user pushes no button for a certain time, for example, for thirty seconds, the CFP time slot 903 can be released for another transmission. Thus, a CFP slot is reserved only when the user uses the remote commander.

Preferably, the remote command should be processed immediately in the server 2 and the client TV 14. If the command causes an interrupt to the client or server CPU (102 or 302), the highest priority should be given to the interrupt.

It is to be understood that while MPEG encoding is presumed, the principles advanced herein can be applied to other AV codec technologies, for example, H.264/MPEG4 AVC may be applied.

It may now be recognized that the advantages afforded by the present invention include the following. When the GUI is on, a different encoding pattern is applied to improve response and GUI picture quality. Also, a remote command is transmitted to the destination with a time slot in the contention-free period, so that no significant transmission delay occurs. And, no special hardware is required because the invention may be implemented if desired with software changes only.

While the particular SYSTEM AND METHOD FOR IMPROVING HOME NETWORK GUI RESPONSE TIME AND PRESENTATION is herein shown and described in detail, it is to be understood that the subject matter which is encompassed by the present invention is limited only by the claims.

What is claimed is:

1. A method for displaying a graphical user interface (GUI) on a video display in a network including a client device communicating with a server, the client device receiving input from a user input device, the method comprising:

using a first video encoding with a first group of pictures (GOP) to display moving video on the video display; and using a second video encoding with a second group of pictures (GOP) to display the GUI on the video display, the second encoding being different from the first encoding, wherein a GOP in the second encoding includes at least one of: more than the number of frames in a GOP of the first encoding, or more than the amount of data in an I-frame of the first encoding.

2. The method of claim 1, wherein the client device is a TV, the user input device is a wireless remote control device communicating with the TV, the video display is established by the TV, and signals from the remote control device are received by the TV and sent to the server.

3. The method of claim 1, wherein the first video encoding is optimized for video streaming and the second video encoding is optimized for graphics.

4. The method of claim 3, wherein the first video encoding is MPEG encoding defining a group of pictures (GOP), each GOP including an intra-frame (I-frame), plural predictive frames (P-frames) and plural bi-directionally predictive frames (B-frames).

5. The method of claim 1, wherein a GOP of the second encoding includes more than the number of I-frames as a GOP of the first encoding, each I-frame in a GOP of the second encoding carrying more than the amount of data as that carried in an I-frame in a GOP of the first encoding.

6. The method of claim 1, wherein a GOP of the second encoding has only at least I-frames and P-frames, but no B-frames.

7. The method of claim 1, wherein a GOP of the second encoding includes thirty frames including one I-frame and twenty-nine P-frames.

8. The method of claim 1, wherein a GOP of the second encoding includes only I-frames.

9. A server for a system including at least one client device configured to display audio/video streams from the server and at least one user input device, the server:

sending graphical user interface (GUI) signals to the client device using a second video encoding with a second group of pictures (GOP); and sending video stream signals to the client device using a first video encoding with a first GOP, the first video encoding being different from the second video encoding, wherein a group of pictures (GOP) of the second encoding includes thirty frames including one I-frame and twenty-nine P-frames.

10. The server of claim 9, wherein the client device is a TV, the user input device is a wireless remote control device communicating with the TV, and signals from the remote control device are received by the TV and sent to the server.

11. The server of claim 9, wherein the first video encoding is optimized for video streaming and the second video encoding is optimized for graphics.

12. The server of claim 11, wherein the first video encoding is MPEG encoding defining a group of pictures (GOP), each GOP including an intra-frame (I-frame), plural predictive frames (P-frames) and plural bi-directionally predictive frames (B-frames).

13. The server of claim 11, wherein the second encoding defines a group of pictures (GOP), a GOP in the second encoding including at least one of more than the number of frames in a GOP of the first encoding, or more than the amount of data in an I-frame of the first encoding.

14. The server of claim 13, wherein a GOP of the second encoding includes more than the number of I-frames as a GOP of the first encoding, each I-frame in a GOP of the second encoding carrying more than the amount of data as that carried in an I-frame in a GOP of the first encoding.

15. The server of claim 13, wherein a GOP of the second encoding has only at least I-frames and P-frames, but no B-frames.

16. The server of claim 13, wherein a GOP of the second encoding includes only I-frames.

* * * * *